(12) United States Patent
Suh et al.

(10) Patent No.: US 12,179,621 B2
(45) Date of Patent: Dec. 31, 2024

(54) ELECTRIC VEHICLE PORT

(71) Applicant: Archer Aviation, Inc., San Jose, CA (US)

(72) Inventors: Young-Joon Suh, Mountain View, CA (US); Erik Saetre, Los Angeles, CA (US); Julien Thiebaud, Mountain View, CA (US); Nicolas Rousseau, Mountain View, CA (US); Julien Montousse, Mountain View, CA (US); Niki James Smart, Los Angeles, CA (US)

(73) Assignee: Archer Aviation, Inc., San Jose, CA (US)

( * ) Notice: Subject to any disclaimer, the term of this patent is extended or adjusted under 35 U.S.C. 154(b) by 218 days.

(21) Appl. No.: 17/885,110

(22) Filed: Aug. 10, 2022

(65) Prior Publication Data

US 2023/0048651 A1 Feb. 16, 2023

Related U.S. Application Data

(60) Provisional application No. 63/232,096, filed on Aug. 11, 2021.

(51) Int. Cl.
| | | |
|---|---|---|
| *B64F 1/22* | (2024.01) | |
| *B60L 53/18* | (2019.01) | |
| *B60L 53/302* | (2019.01) | |
| *B60L 53/36* | (2019.01) | |
| *B64F 1/30* | (2006.01) | |

(Continued)

(52) U.S. Cl.
CPC ............... *B60L 53/36* (2019.02); *B60L 53/18* (2019.02); *B60L 53/302* (2019.02); *B64F 1/22* (2013.01); *B64F 1/30* (2013.01); *B64F 1/35* (2024.01); *B64F 1/362* (2013.01); *E01F 3/00* (2013.01); *B60L 2200/10* (2013.01)

(58) Field of Classification Search
CPC ...... B64F 1/22; B64F 1/35; E01F 3/00; B64U 2101/61
See application file for complete search history.

(56) References Cited

U.S. PATENT DOCUMENTS

2011/0233331 A1 9/2011 Frings et al.
2020/0055594 A1* 2/2020 Tal .......................... B64C 37/00
(Continued)

FOREIGN PATENT DOCUMENTS

EP 3845408 A2 7/2021
WO 2019/020162 A1 1/2019
(Continued)

OTHER PUBLICATIONS

International Search Report and Written Opinion mailed Nov. 3, 2022, directed to International Application No. PCT/US2022/074745; 14 pages.

(Continued)

*Primary Examiner* — Nicholas McFall
(74) *Attorney, Agent, or Firm* — Morrison & Foerster LLP

(57) ABSTRACT

A port for electric vehicles includes an off-loading zone for off-loading one or more passengers from an electric vehicle; a loading zone for loading one or more passengers onto the electric vehicle; and a charging zone for charging the electric vehicle while the electric vehicle is moving from the off-loading zone to the loading zone.

18 Claims, 14 Drawing Sheets

(51) Int. Cl.
*B64F 1/35* (2024.01)
*B64F 1/36* (2017.01)
*E01F 3/00* (2006.01)

(56) References Cited

U.S. PATENT DOCUMENTS

2020/0130863 A1 4/2020 Zosel
2021/0197683 A1 7/2021 Graham
2021/0269175 A1 9/2021 Tal

FOREIGN PATENT DOCUMENTS

WO 2020/117692 A1 6/2020
WO 2022/099030 A1 5/2022

OTHER PUBLICATIONS

Examination report No. 1 for standard patent application dated Mar. 8, 2024, directed to Australian Application No. 2022328323; 2 pages.
Notice of Acceptance for Patent Application mailed Apr. 16, 2024, directed to AU Application No. 2022328323; 3 pages.
Office Action mailed Apr. 25, 2024, directed to CA Application No. 3,228,613; 4 pages.
Urdesign. (May 11, 2018). "Uber Hover by Humphreys & Partners," located at www.youtube.com/watch?V=3JBv6zYJuo0; 9 pages.

\* cited by examiner

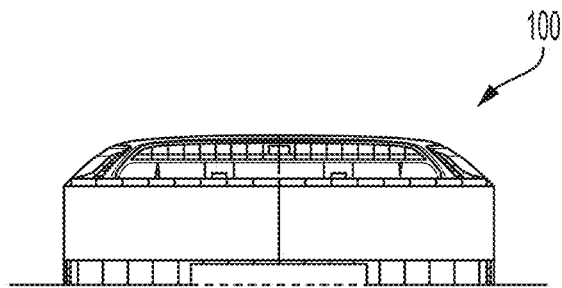
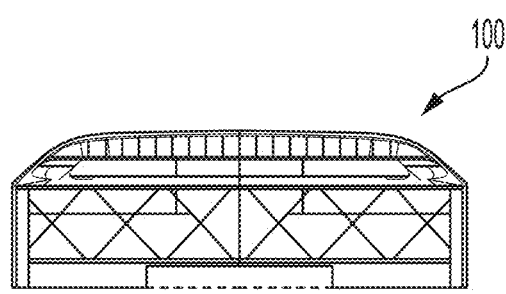
FIG. 1E    FIG. 1F
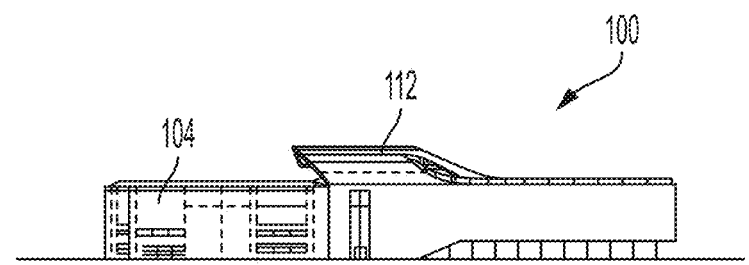
FIG. 1G
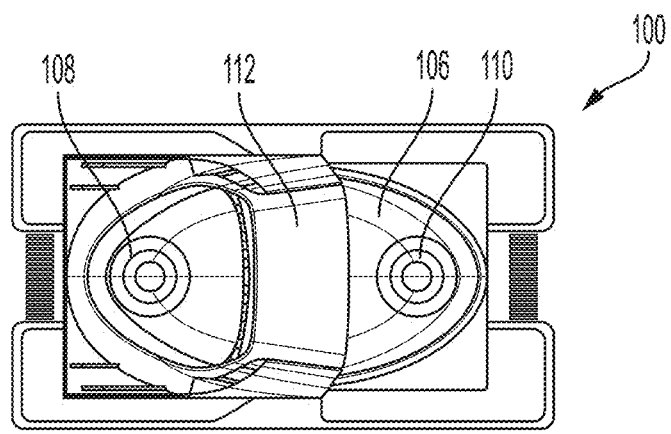
FIG. 1H

ELECTRIC VEHICLE PORT

CROSS-REFERENCE TO RELATED APPLICATIONS

This application claims the benefit of U.S. Provisional Application No. 63/232,096, filed Aug. 11, 2021, the entire contents of which are incorporated herein by reference.

FIELD

This disclosure generally relates to electric vehicles, and more specifically to electrical vertical take-off and landing aircraft.

BACKGROUND

Vertical take-off and landing (VTOL) aircraft are aircraft that can take-off and land vertically and hover, providing the ability to carry travelers directly to their destination. Helicopters are VTOL aircraft that generate lift entirely through their rotors. Some VTOL aircraft have wings and propulsion systems that enable the wings to provide the lift required during forward flight. Some winged VTOL aircraft can be sufficiently efficient in forward flight that the aircraft can be battery powered. Electric VTOL aircraft may require battery charging or battery swapping between flights. Thus, the availability of electric VTOL aircraft may be less than hydrocarbon powered aircraft.

SUMMARY

According to various aspects, a port for electric vehicles to load and unload passengers is configured for high throughput and availability of electric vehicles. The port includes an unloading zone, a loading zone spaced from the unloading zone, and a charging zone located between the unloading and loading zones in which the electric vehicle can be charged when moving from the unloading zone to the loading zone. The port can include multiple lanes, each including its own unloading zone, loading zone, and charging zone. Electric vehicles that have arrived at the port can be routed to a particular lane based on a charging time for the electric vehicle such that vehicles that require less charge can be cycled quickly through a fast lane while longer charging vehicles can be charged through a slower lane.

The electric vehicles can be electric vertical take-off and landing aircraft that may land at a landing zone and then may be directed to the unloading zone. The aircraft may be moved to the unloading zone via a separate tug vehicle such that the aircraft does not move under its own power to the unloading zone. The tug vehicle may move the aircraft from the unloading zone and through the charging zone to the loading zone. Once passengers are loaded on the aircraft, the tug vehicle may move the aircraft to a take-off zone. Optionally, the port may have a single landing zone and a single take-off zone and multiple lanes for unloading, charging, and loading.

According to an aspect, a port for electric vehicles includes an off-loading zone for off-loading one or more passengers from an electric vehicle; a loading zone for loading one or more passengers onto the electric vehicle; and a charging zone for charging the electric vehicle while the electric vehicle is moving from the off-loading zone to the loading zone.

Optionally, the port includes multiple lanes, each lane comprising a respective off-loading zone, loading zone, and charging zone.

Optionally, the electric vehicle is an electric aircraft.

Optionally, the port include a landing zone for aircraft to land and a take-off zone for aircraft to take-off, wherein the charging zone is located in a facility and the facility is located between the landing zone and the take-off zone.

Optionally, the port includes at least one tug vehicle for moving the electric aircraft from the landing zone to the off-loading zone.

Optionally, the at least one tug vehicle is autonomous.

Optionally, the port includes separate access ramps for passengers to access the off-loading zone and the loading zone.

Optionally, the port includes a tether for connecting to the electric vehicle to provide electricity while the electric vehicle is moving through the charging zone.

Optionally, the tether is configured to automatically connect to the electric vehicle.

Optionally, the tether is configured to cool the electric vehicle during charging.

According to an aspect, a method for off-loading and loading passengers of electric vehicles includes positioning the electric vehicle at an off-loading zone and off-loading at least one arriving passenger; moving the electric vehicle through a charging zone toward a loading zone and charging the electric vehicle while the electric vehicle is moving toward the loading zone; and loading at least one departing passenger on the electric vehicle while the electric vehicle is located in the loading zone.

Optionally, the method includes routing the electric vehicle to a particular off-loading zone based on a required amount of charging.

Optionally, the method includes moving the electric vehicle toward the loading zone by a tug vehicle.

Optionally, the tug vehicle is autonomous.

Optionally, the electric vehicle is an electric aircraft, and the method includes directing the electric aircraft to land at a landing zone before off-loading the at least one arriving passenger and directing the electric aircraft to take-off from a take-off zone after loading the at least one departing passenger, wherein the landing zone and the take-off zone are separate zones located on opposite sides of the charging zone.

Optionally, the method includes cooling the electric vehicle while the electric vehicle is charging.

Optionally, the method includes flowing coolant to the electric vehicle for cooling the electric vehicle while charging the electric vehicle.

Optionally, the method includes automatically connecting a charging tether to the electric vehicle.

Optionally, the method includes charging multiple electric vehicles simultaneously in adjacent charging zones.

Optionally, the electric vehicle moves in a single direction from the off-loading zone to the loading zone.

BRIEF DESCRIPTION OF THE DRAWINGS

The invention will now be described, by way of example only, with reference to the accompanying drawings, in which:

FIG. 1E is a front view of the port of FIGS. 1A-1D, FIG. 1F is a rear view of the port, FIG. 1G is a side of the port, and FIG. 1H is a top view of the port, according to various embodiments;

DETAILED DESCRIPTION

Figure 1A:
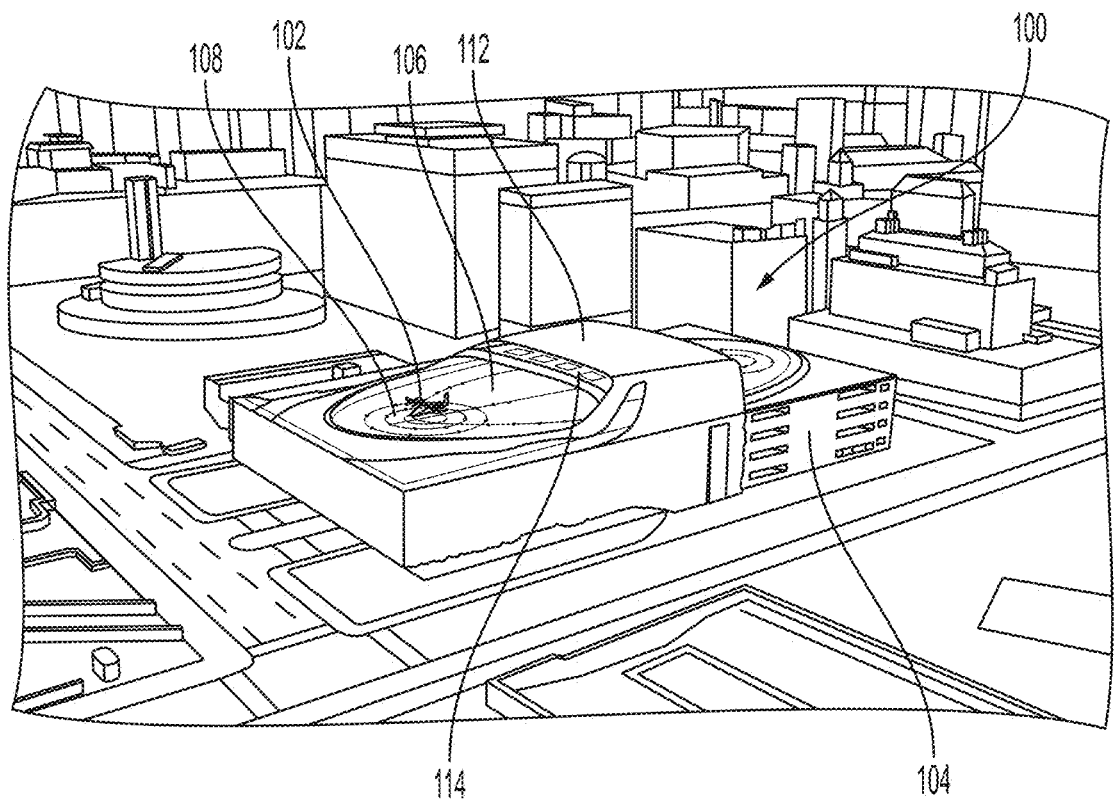
FIGS. 1A-1D are perspective views of a port for electric vertical take-off and landing aircraft 100, according to various embodiments.
Figure 1B:
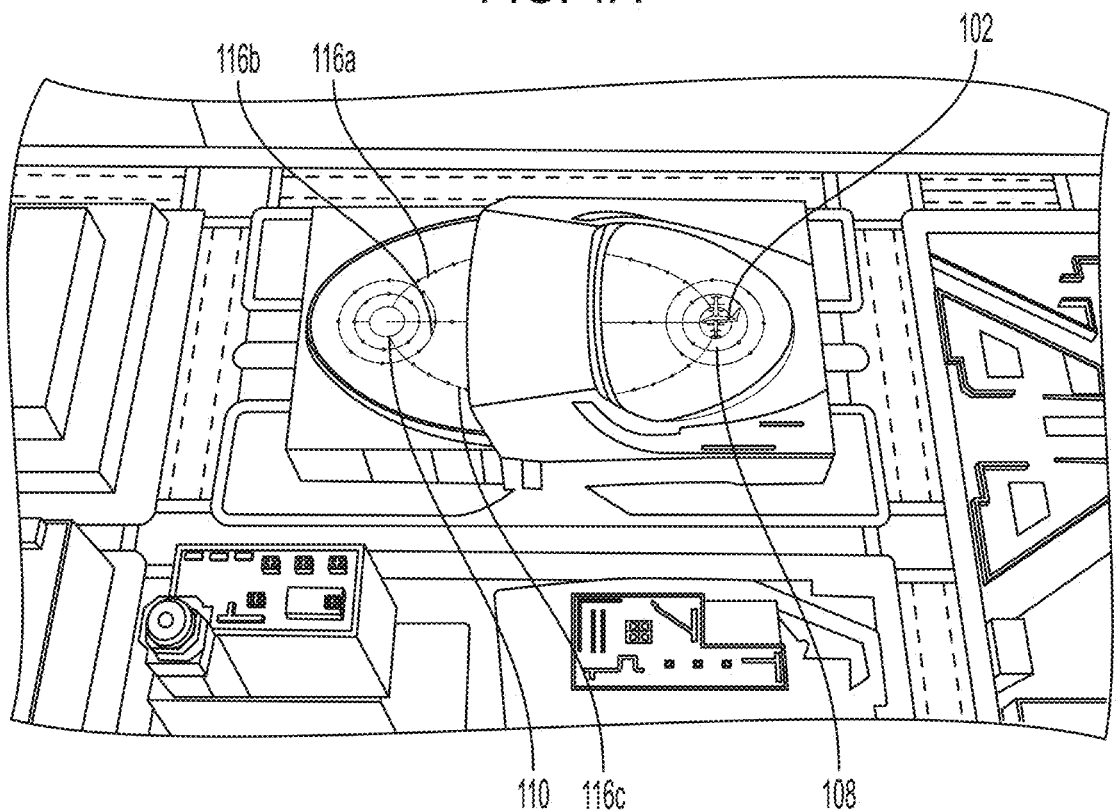
Figure 1C:
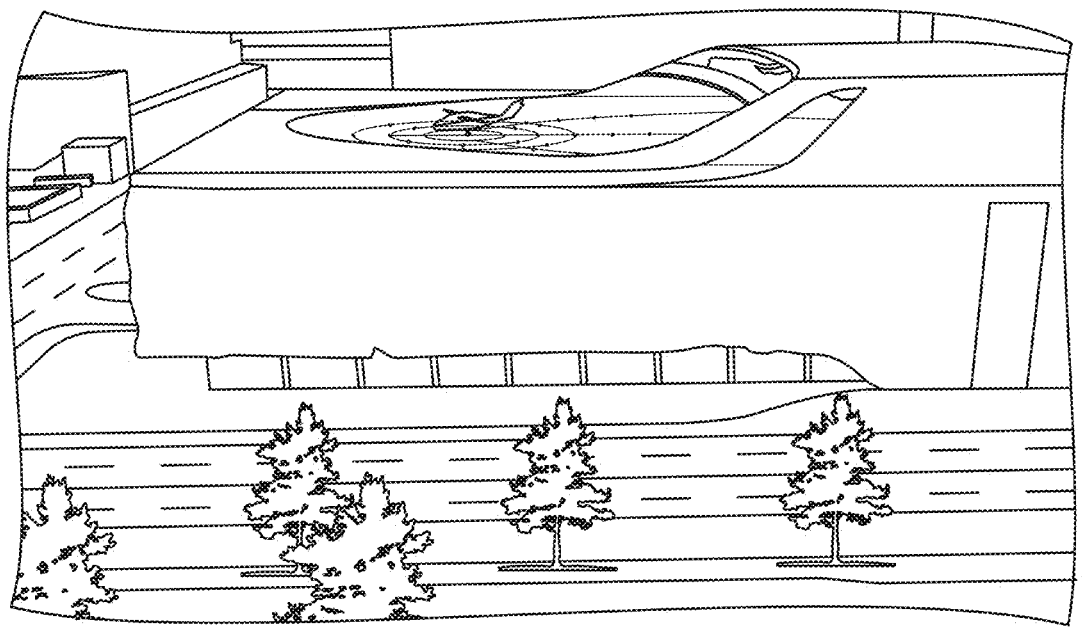
Figure 1D:
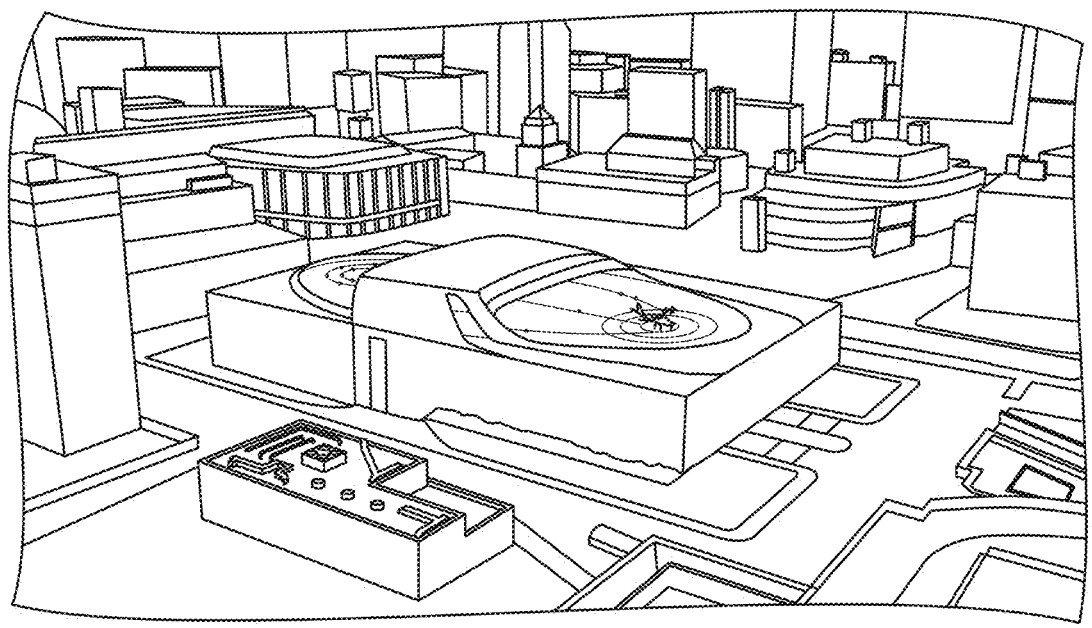

Described herein are various aspects of ports configured for high throughput of electric vehicles, such as electric VTOL aircraft, electric buses, electric boats, and electric cars. Ports can be configured with multiple charging lanes for simultaneously charging multiple the onboard batteries of multiple electric vehicles. Ports may include landing and take-off zones that are spaced from one another, which reduces congestion and can increase throughput through the port. Electric vehicles may move through the port from arrival, through charging lanes, and to departure in the same direction, which can avoid delays associated with electric vehicles crossing paths. Ports may include spaced apart zones for passenger unloading and loading, which can provide non-crossing paths for passenger movement through the port. Electric vehicles may be charged in a charging zone located between the unloading and loading zones. Electric vehicles may charge while moving through the charging zone.

The charging zone may include a tether system that may manually or automatically connect to a port of the aircraft. The tether system may provide electricity to the electric vehicle for charging. A tether connected to the electric vehicle may be movable with the aircraft as the electric vehicle moves through the charging zone, so that the aircraft can charge as it is moving through the charging zone. The tether system may be configured to provide cooling fluid to the electric vehicle for cooling the batteries during charging.

The electric vehicle may by moved through the port between the landing and take-off zones by a tug vehicle. The tug vehicle may be an autonomous, semi-autonomous, or manually operated vehicle. In some variations, the electric vehicle may move through at least a portion of the port under its own power.

Electric vehicles may be routed to different charging lanes of the port based on a desired charging time for the electric vehicle. For example, electric vehicles that require shorter charging times (e.g., the vehicles just completed a relative short trip) may be routed to a different lane than vehicles requiring longer charging times. For example, charging lanes can be designated for 10 minute charging, 20 minute charging, and 30 minute charging. An arriving vehicle that will require 20 minutes to charge (to fully charge or to charge to a level required for a next trip) may be routed to the 20 minute charge lane. By directing vehicle to different lanes based on charging, vehicles that need less charging time are not stuck behind vehicles that need more charging time, which can increase the throughput of electric vehicles through the port.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

FIG. 1A-H illustrate a port 100 for VTOL aircraft 102. FIG. 1A-D are perspective views of the port 100, FIG. 1E is a front view of the port 100, FIG. 1F is a rear view of the port 100, FIG. 1G is a side of the port 100, and FIG. 1H is a top view of the port 100. The port 100 provides terminals for passengers embarking and disembarking the aircraft 102. The port 100 may be located on the top of a building 104, such as a parking structure. In some embodiments, the building is a pre-existing, such as a pre-existing parking structure, that is retrofitted with the port 100.

The port 100 includes a runway level 106 that includes a landing zone 108 at one side and a take-off zone 110 located at an opposite side. Located between the landing and take-off zones is a lounge level 112 that provides passenger access to the runway level 106. The lounge level 112 may have a waiting area 114 where departing passengers may wait for their aircraft to be ready for loading. The waiting area 114 may include a check-in area, restaurants, shops, etc. The lounge level 112 is supported above the runway level 106 such that aircraft 102 can move under the lounge level 112.

The aircraft 102 lands at the landing zone 108 and moves to the lounge level 112 for passengers to disembark. After passengers disembark, the aircraft 102 moves through the lounge level 112 to a loading zone where departing passengers get onto the aircraft. As the aircraft 102 is moving through the lounge level 112, the aircraft 102 is charged. Once the aircraft 102 is charged and departing passengers have been loaded, the aircraft moves to the take-off zone 110 from which the aircraft departs once cleared.

The port 100 may include multiple lanes 116a-c for aircraft to move through the port 100. Each lane 116a-c may begin at the same landing zone and end at the same take-off zone or there may be multiple landing zones and/or multiple take-off zones. With multiple lanes 116a-c, the port can handle multiple arriving/departing aircraft at the same time. Although three lane are shown, a port can include any number of lanes depending on the available space and expected throughput of the port. In some cases, a port may include just a single lane. A port may include at least two lanes, at least three lanes, at least four lanes, at least five lanes, or more. A port may include multiple different lounge levels that may each include multiple lanes.

Figure 2A:
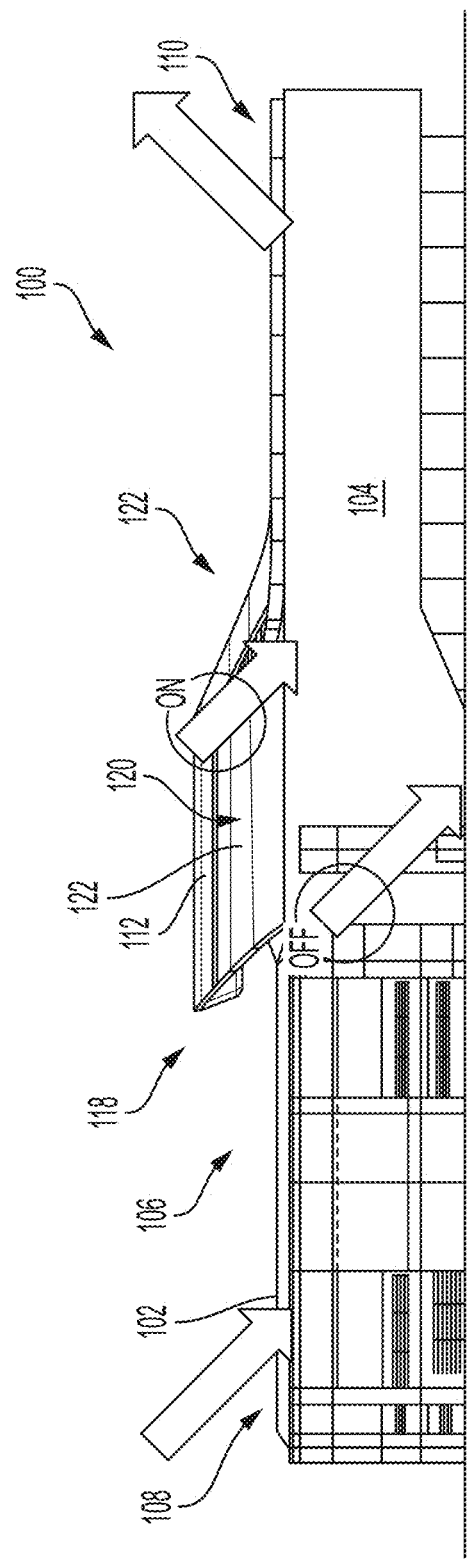
FIGS. 2A and 2B illustrate the movement of an electric aircraft through a port, according to various embodiments.
Figure 2B:
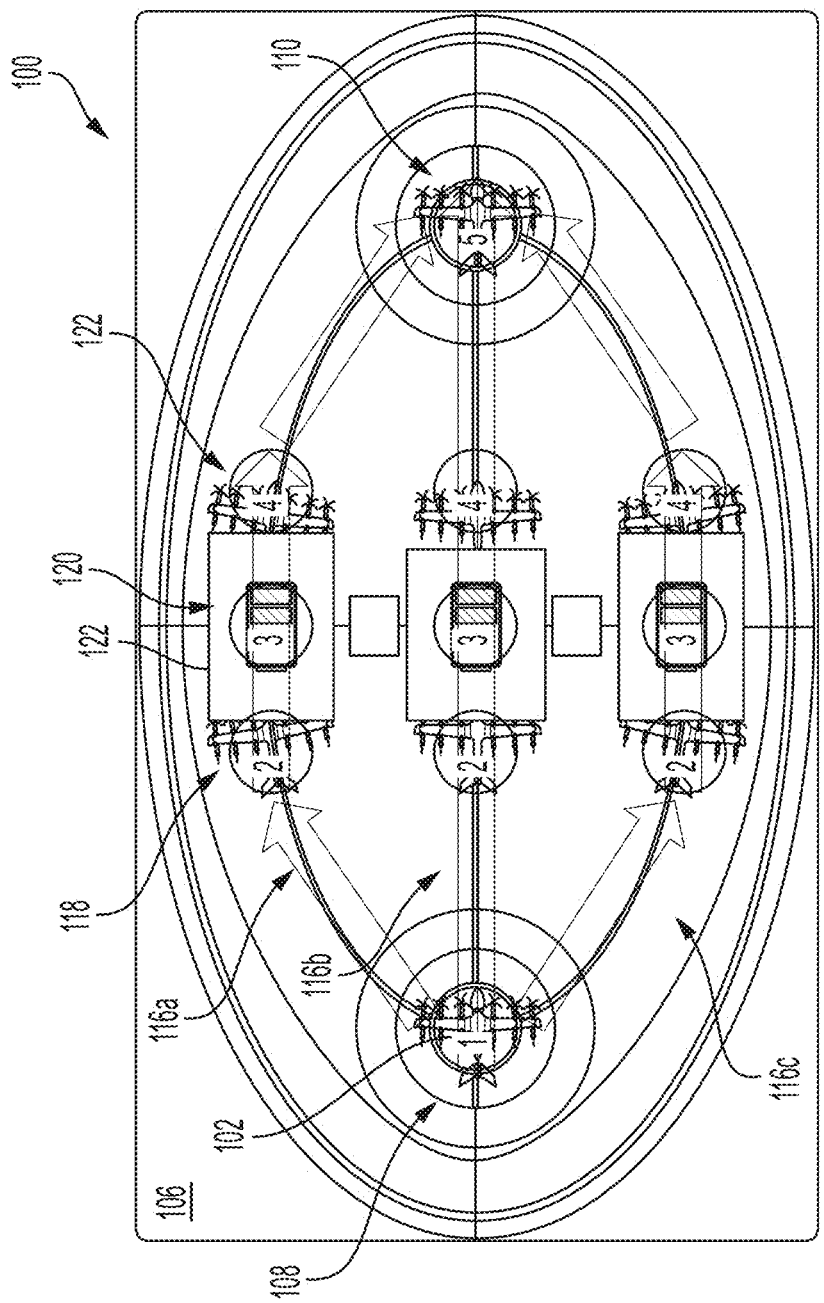

FIGS. 2A and 2B illustrate the movement of an electric aircraft 102 through the port 100, according to various embodiments. FIG. 2A is a side view of the port 100. FIG. 2B is a plan view of the port 100 with the lounge level 112 not shown. The aircraft 102 lands at the landing zone 108. The aircraft 102 then moves or is moved to an unloading zone 118. The aircraft may move to the unloading zone 118 under its own power or may be towed to the unloading zone, such as via a tug vehicle that moves out to the loading zone, latches to the aircraft 102 and tows the aircraft 102 to the unloading zone 118. The tug vehicle could be, for example, an electric vehicle. Optionally, the tug vehicle operates autonomously.

When the aircraft is at the unloading zone 118, any passengers on the aircraft 102 disembark and exit the runway level 106. The passengers may exit the port 100 in a downward direction through the building 104.

After passengers have left the aircraft 102, the aircraft 102 moves through a charging zone 120 toward a loading zone 122. While in the charging zone 120, the aircraft 102 may be tethered to charging lines that provide charging energy to the aircraft 102 for charging the batteries of the aircraft 102. The charging zone 120 may include an overhead structure 122 for supporting a charging tether that connects to the aircraft from above, which can ensure that power lines are not running along the floor of the runway level 106.

The aircraft 102 may be moved through the charging zone 120 by a tug vehicle. The aircraft 102 may move continuously through the charging zone 120 to the loading zone 122 or may stop within the charging zone 120. The aircraft 102 may charge as the aircraft 102 moves through the charging zone 120, may charge when the aircraft 102 is stationary within the charging zone 120, or both. The aircraft 102 charges for an amount of time sufficient to reach a desired charge level, which may be a desired charge level for the next flight or can be a threshold charge level that is not based on the next flight (i.e., all aircraft charge to the same predetermined level regardless of their next flight plan).

The aircraft 102 moves through the charging zone 120 to the loading zone 122. While in the loading zone 122, the aircraft 102 may not be tethered to the charging system. While the aircraft 102 is in the loading zone 122, departing passengers can move from the lounge level 112 to the runway level 106 and move onboard the aircraft 102. The departing passengers may move downward from the lounge level 112 to the runway level 106, such as via one or more ramps, staircases, elevators, etc. The pathway for departing passengers to access the runway may be different than the pathway for arriving passengers such that departing passengers and arriving passengers remain separate while in the port 100.

Once departing passengers are loaded on the aircraft 102, the aircraft 102 moves to the take-off zone 110. The aircraft 102 may be moved to the take-off zone 110 by a tug vehicle. The aircraft 102 may then power on its propulsion system and take-off when cleared.

A port 100 may include multiple unloading/loading/charging lanes. The example illustrated in FIG. 2B includes three lanes, indicated by reference numerals 126a-c. An aircraft 102 that has landed at the landing zone 108 is routed to one of the lanes 126a-c. Lanes may be designated based on charging time, such that aircraft that require less charging may be routed to a different lane than aircraft that require more charging. For example, the three lanes illustrated in FIGS. 2B and 2C may be divided into short, medium, and long charging times. The aircraft 102 may provide battery level information to the port 100, such as prior to arrival or upon arrival, and the port 100 may determine which lane to route the aircraft based on a determined amount of charging time for the aircraft 102 to be able to accomplish its next flight. A tug vehicle may come out to the aircraft 102 at the landing zone 108, attached to the aircraft 102, and tow the aircraft 102 to the appropriate lane 126a-c.

As illustrated by the arrows in FIG. 2B, electric aircraft move through the port 100, from the landing zone 108, through the charging zones 120, to the take-off zone 110 in the same direction (left-to-right in FIG. 2B). This streamlined movement of aircraft through the port 100 can increase the throughput of aircraft through the port by minimizing the changes of aircraft crossing paths.

Figure 3:
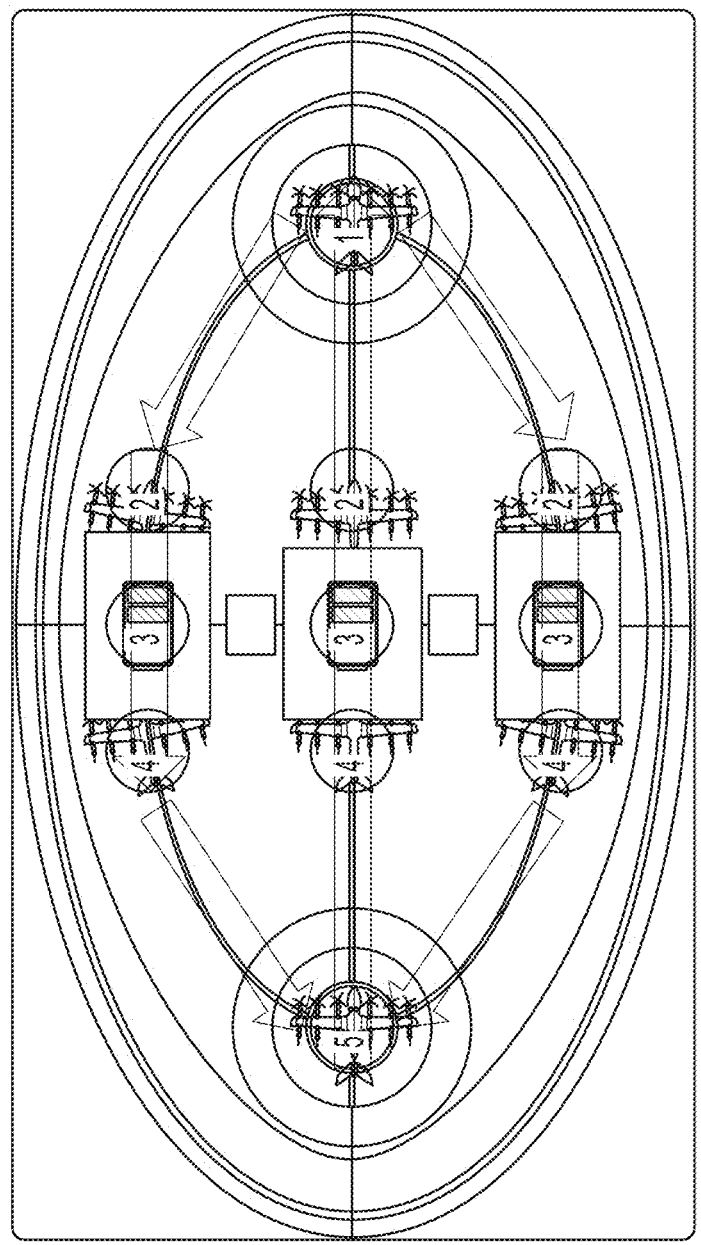
FIG. 3 illustrates the reversal of the movement of aircraft through the port relative to that shown in FIG. 2B, according to various embodiments.

FIG. 3 illustrates the reversal of the movement of aircraft 102 through the port 100 relative to that shown in FIG. 2B, which may be used depending on weather conditions. In the reversal condition, the take-off and landing zone locations are swapped, the loading and unloading zones are swapped, and the direction of movement through the charging zone is reversed relative to the flow illustrated in FIGS. 2A-B.

Figure 4:
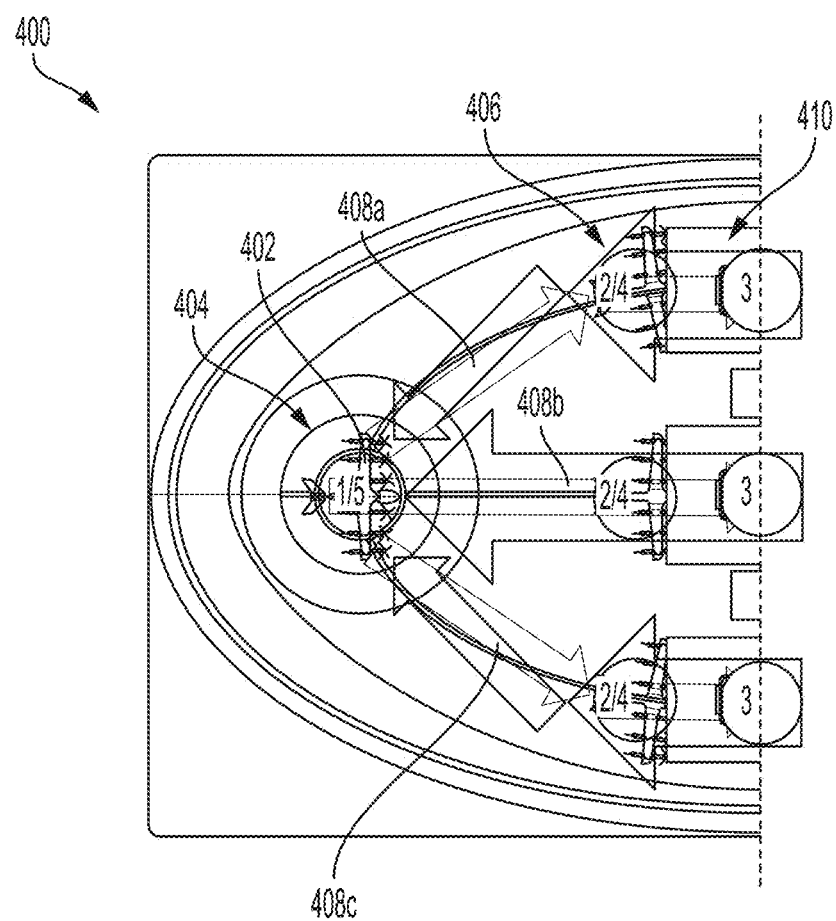
FIG. 4 illustrates a configuration of a port that may be used in confined spaces, according to various embodiments.

FIG. 4 illustrates a configuration of a port 400 that may be used in confined spaces that are not large enough to accommodate port 100. Relative to port 100, port 400 can be about half the size. The aircraft 402 land and take-off at the same zone 404. An arriving aircraft 402 move to an unloading zone 406 of a designated lane 408a-c for passengers to offload. The aircraft 402 then moves to the charging zone 410 where it charges and turns around to face the opposite direction. The aircraft 402 then moves back to the same zone 406 used for unloading, at which point passengers may board the aircraft 402. The aircraft 402 then moves to the landing/take-off zone 404 for take-off.

Figure 5A:
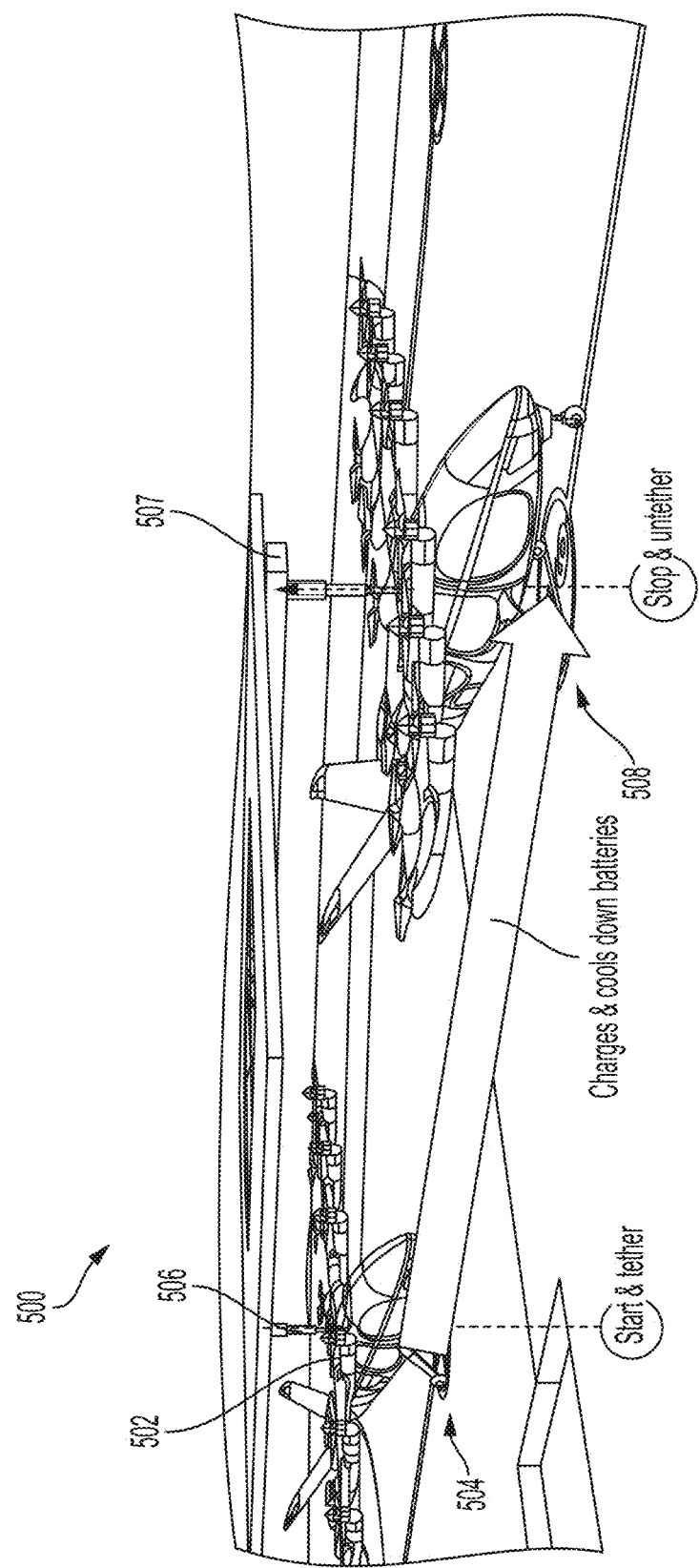
FIGS. 5A and 5B illustrate aspects of a charging zone, according to various embodiments.
Figure 5B:
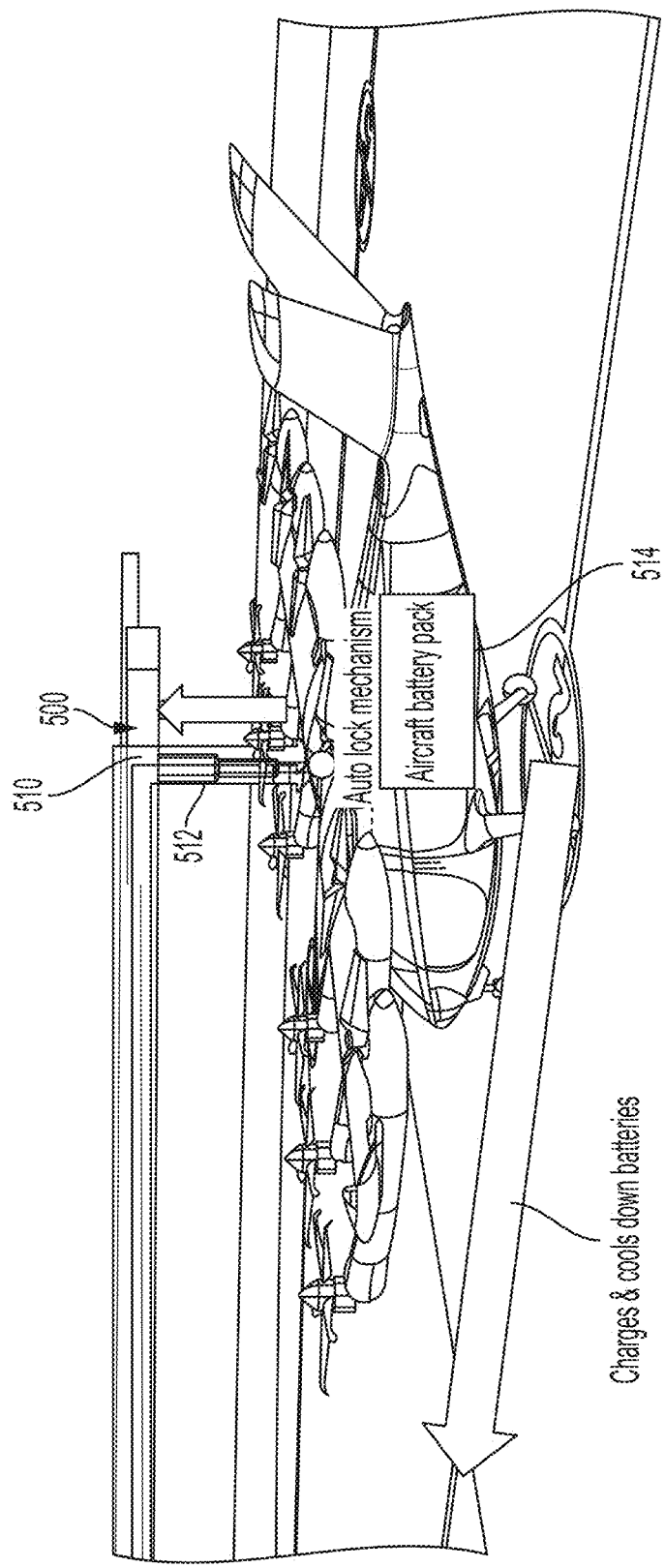

FIGS. 5A and 5B illustrate aspects of a charging zone 500, according to various aspects. The aircraft 502 may move to a starting zone 504 of the charging zone 500 at which time a charging tether 506 may be connected to the aircraft 502. The charging tether 506 may be mounted to a support structure 507 above the aircraft 502 and may connect to an upper portion of the aircraft 502. The charging tether 506 may be manually connected to a charging port of the aircraft 502 or may automatically connect to a charging port of the aircraft 502. The charging tether 506 may be telescopic and may telescope downward to connect to the aircraft 502 and retract upward once charging is complete. The charging tether 506 may be movable along the support structure 507 so that the charging tether 506 can remain connected to the aircraft 502 as the aircraft 502 moves through the charging zone 500 to an ending zone 508 of the charging zone 500. In some variations, the aircraft 502 may remain stationary while charging. One the aircraft 502 is located in the ending zone 508 and done charging, the charging tether 506 may disconnect (automatically or manually) from the aircraft 502.

In addition to charging the aircraft 502, the charging zone 500 may be configured to cool the aircraft 502 during charging. For example, the charging tether 506 may include a cooling line 510 in addition to a charging line 512. The cooling line 510 may flow a cooling fluid (e.g., air or a coolant) that may move through the aircraft 502. The aircraft 502 may include a cooling pathway that routes cooling fluid through the aircraft, such as through heat exchangers for the battery packs 514. Cooling may be beneficial while charging due to the increase in temperature caused by charging and the lack of air cooling that would otherwise be available while the aircraft is flying.

Figure 6:
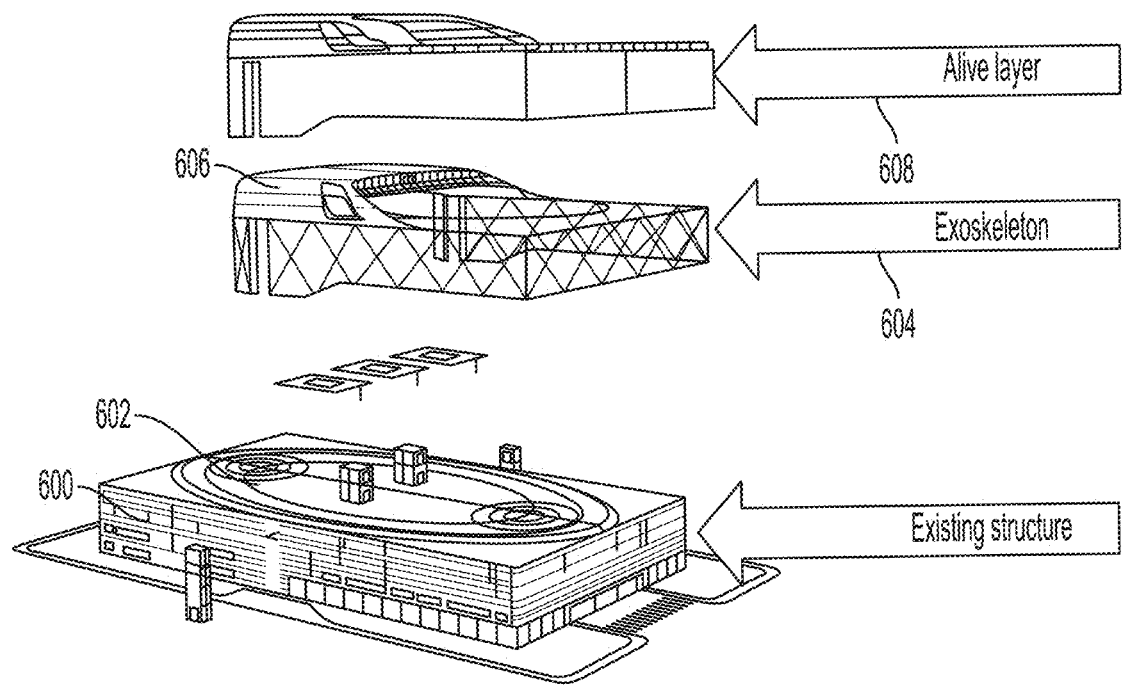
FIG. 6 illustrates an example of retrofitting a port to an existing structure.

As noted above, a port can be retrofitted to an existing building, such as a parking garage. FIG. 6 illustrates an example of retrofitting a port to an existing structure. The runway level 602 of the port is formed on or built atop the top of the existing structure 600. An exoskeleton 604 that includes the lounge level 606 is built onto the existing structure 600. The exoskeleton 604 may support operation components such as elevators, power units, storage, etc. An outer structure 608 is then built around the exoskeleton 604. The outer structure 608 can include an "alive" layer formed of plants, making the port both aesthetically and technically "greener." Existing stairways, ramps, and/or elevators in the existing structure 600 may be used for passengers to access and exit the port. New or additional stairways, ramps, and/or elevators may be added.

Figure 7A:
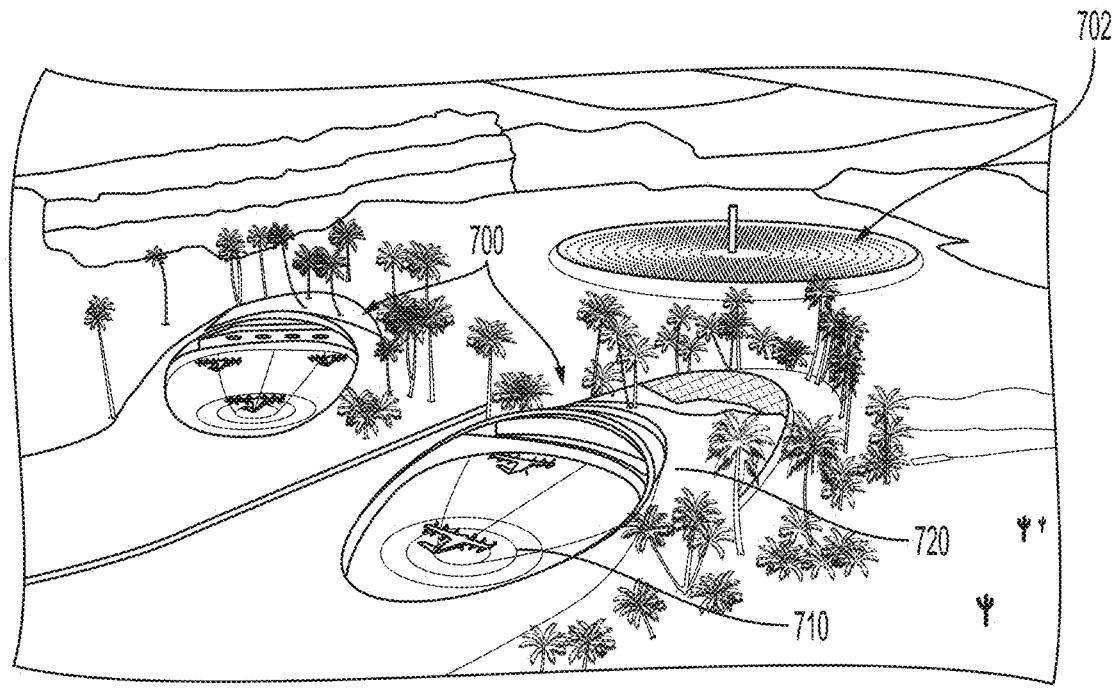
FIGS. 7A-7I illustrate a port installed at a non-urban location, according to various embodiments.
Figure 7B:
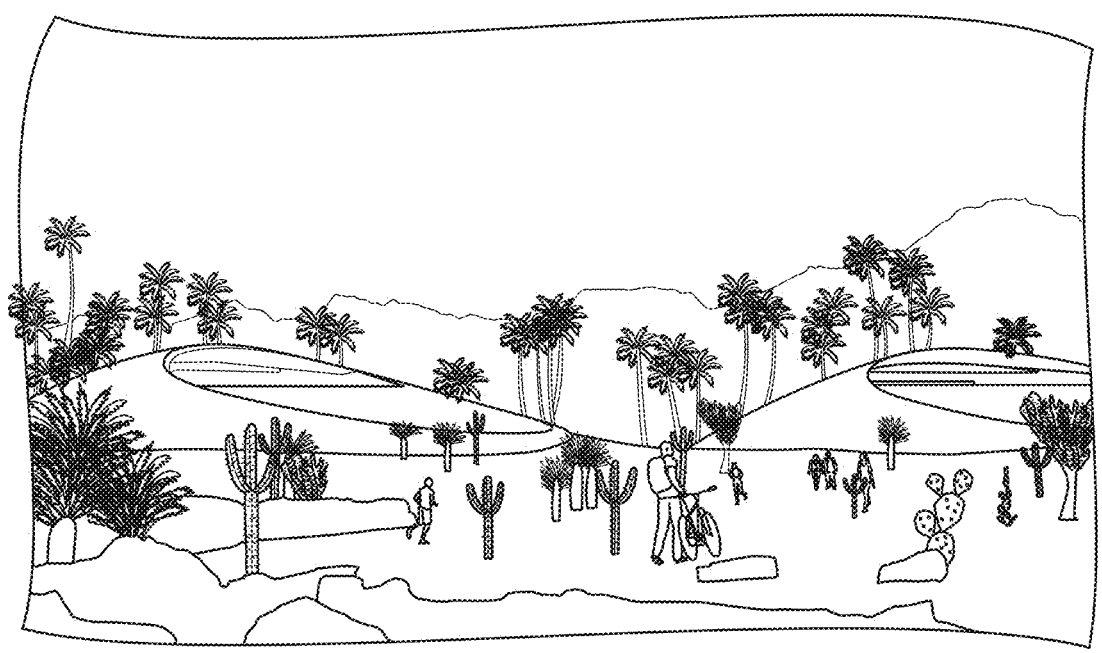
Figure 7C:
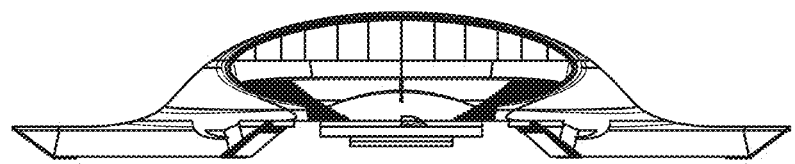
Figure 7D:
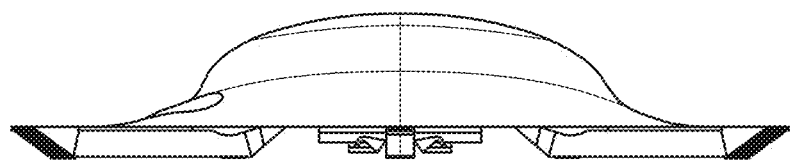
Figure 7E:
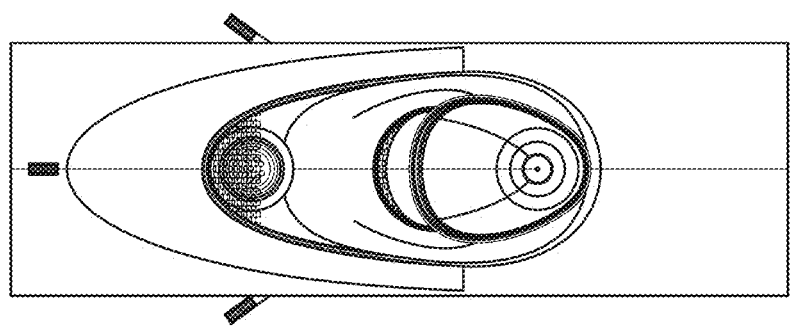
Figure 7F:
Figure 7G:
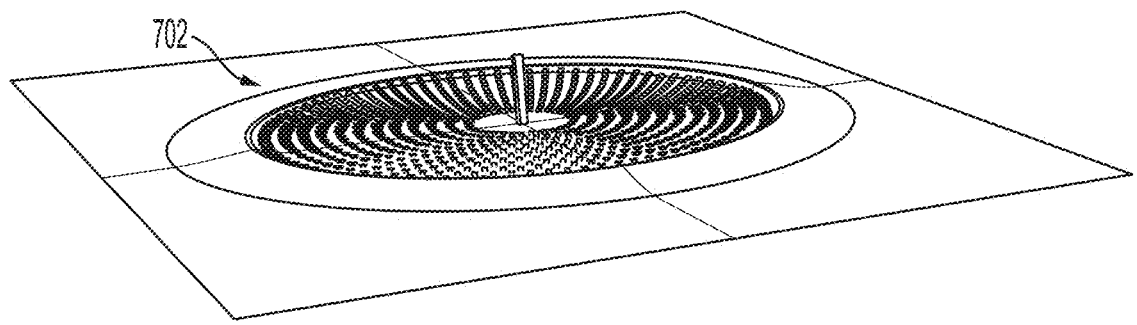
Figure 7H:
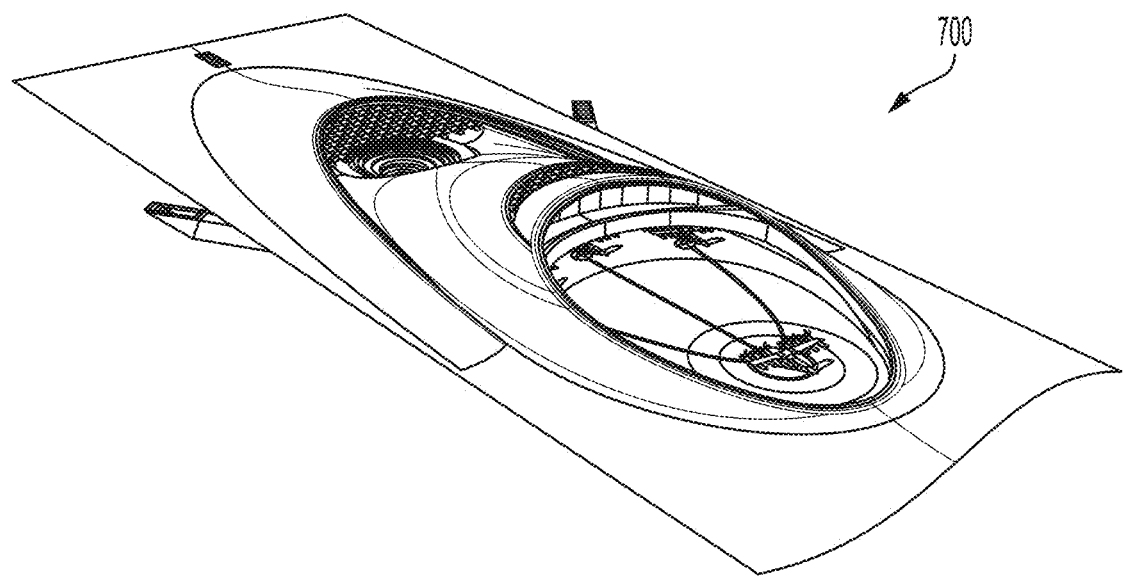
Figure 7I:
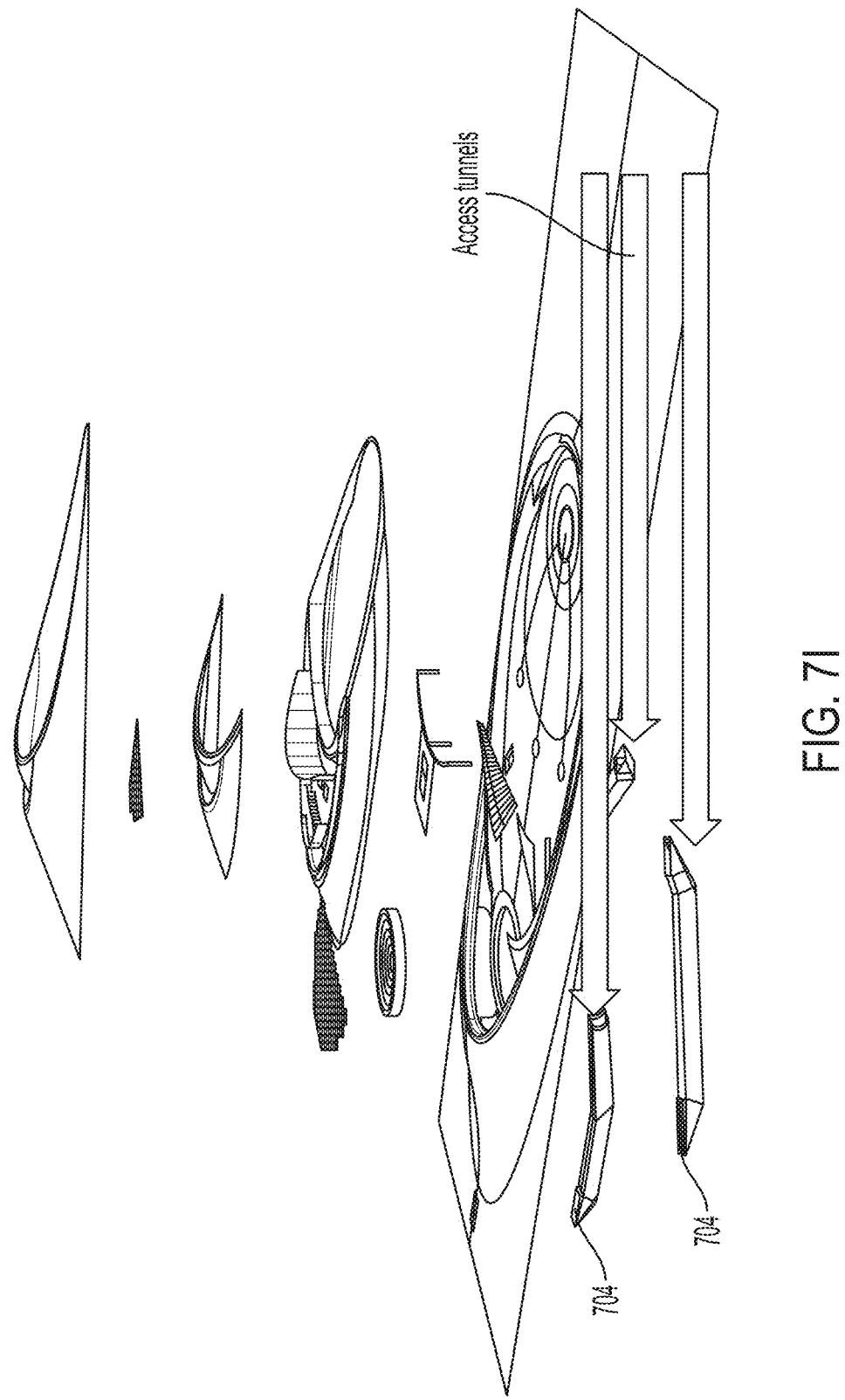

FIGS. 7A-I illustrate a port 700 installed at a remote location, such as a desert, forest, or other non-urban location. The port 700 may be configured in similar fashion to port 100 or port 400, discussed above, with respect to the movement of aircraft through the port 700. In the illustrated example, port 700 is configured in similar fashion to port 400, with a single landing/take-off zone 710. The port 700 may include sloping sides 720 that be designed to blend in with the surrounding environment. A solar energy harvesting farm 702 may be installed nearby the port 700 to provide energy to the port for charging aircraft. The solar farm 702 and/or port 700 may include energy storage for storing energy harvested by the solar farm 702. As shown in FIG. 7I, the port 700 may include tunnels 704 for passengers to safely access and leave the port 700 to and from outside networks, such as train stations, roads, trails, etc., while preserving the surrounding environment. The tunnels 704 may open to the natural surroundings such that an arriving passenger leaves the port 700 directing to the surrounding environment.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A port for electric vehicles comprising:
a plurality of lanes, each lane comprising:
an off-loading zone for off-loading one or more passengers from an electric vehicle;
a loading zone for loading one or more passengers onto the electric vehicle; and
a charging zone for charging the electric vehicle while the electric vehicle is moving from the off-loading zone to the loading zone,
wherein each lane of the plurality of lanes corresponds to a different amount of required charging of electric vehicles such that a particular electric vehicle is routed to a particular lane of the plurality of lanes based on a required amount of charging of the particular electric vehicle.

2. The port of claim 1, wherein the electric vehicle is an electric aircraft.

3. The port of claim 2, wherein the port comprises a landing zone for aircraft to land and a take-off zone for aircraft to take-off, wherein the charging zone of each of the plurality of lanes is located in a facility and the facility is located between the landing zone and the take-off zone.

4. The port of claim 3, further comprising at least one tug vehicle for moving the electric aircraft from the landing zone to the off-loading zone of a lane of the plurality of lanes.

5. The port of claim 4, wherein the at least one tug vehicle is autonomous.

6. The port of claim 1, wherein the port comprises separate access ramps for passengers to access the off-loading zone and the loading zone of a lane of the plurality of lanes.

7. The port of claim 1, comprising a tether for connecting to the electric vehicle to provide electricity while the electric vehicle is moving through the charging zone of a lane of the plurality of lanes.

8. The port of claim 7, wherein the tether is configured to automatically connect to the electric vehicle.

9. The port of claim 7, wherein the tether is configured to cool the electric vehicle during charging.

10. A method for off-loading and loading passengers of electric vehicles comprising:
determining a required amount of charging for an electric vehicle;
selecting a charging lane of a plurality of charging lanes of a port based on the required amount of charging for the electric vehicle, wherein each lane of the plurality of charging lanes comprises an off-loading zone, a charging zone, and a loading zone;
routing the electric vehicle to an off-loading zone of the selected lane and off-loading at least one arriving passenger;
moving the electric vehicle through a charging zone of the selected lane toward a loading zone of the selected lane and charging the electric vehicle while the electric vehicle is moving toward the loading zone of the selected lane; and
loading at least one departing passenger on the electric vehicle while the electric vehicle is located in the loading zone of the selected lane.

11. The method of claim 10, comprising moving the electric vehicle toward the loading zone of the selected lane by a tug vehicle.

12. The method of claim 11, wherein the tug vehicle is autonomous.

13. The method of claim 10, wherein the electric vehicle is an electric aircraft, and the method comprises directing the electric aircraft to land at a landing zone before off-loading the at least one arriving passenger and directing the electric aircraft to take-off from a take-off zone after loading the at least one departing passenger, wherein the landing zone and the take-off zone are separate zones located on opposite sides of the charging zone of the selected lane.

14. The method of claim 10, comprising cooling the electric vehicle while the electric vehicle is charging.

15. The method of claim 14, comprising flowing coolant to the electric vehicle for cooling the electric vehicle while charging the electric vehicle.

16. The method of claim 10, comprising automatically connecting a charging tether to the electric vehicle.

17. The method of claim 10, comprising charging multiple electric vehicles simultaneously in adjacent charging zones.

18. The method of claim 10, wherein the electric vehicle moves in a single direction from the off-loading zone of the selected lane to the loading zone of the selected lane.

\* \* \* \* \*